Figure 1:
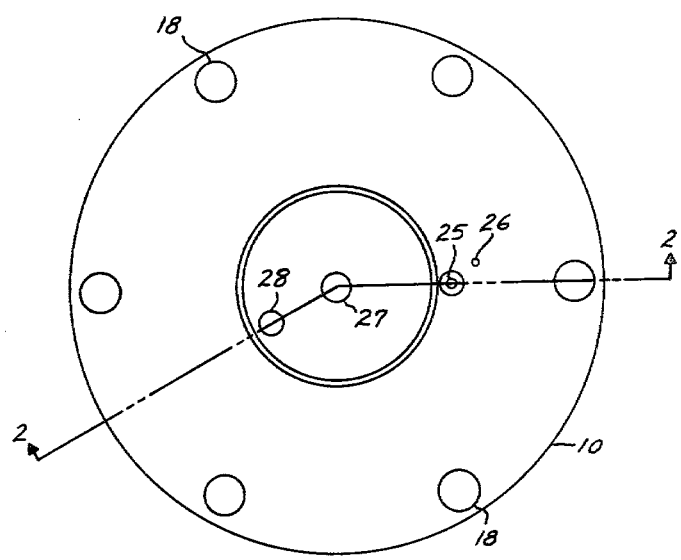

United States Patent [19]

Griffin

[11] 4,233,426

[45] Nov. 11, 1980

[54] CHANNEL SEALANT COMPOSITIONS

[75] Inventor: Warren R. Griffin, Dayton, Ohio

[73] Assignee: The United States of America as represented by the Secretary of the Air Force, Washington, D.C.

[21] Appl. No.: 26,866

[22] Filed: Apr. 4, 1979

Related U.S. Application Data

[62] Division of Ser. No. 830,227, Sep. 2, 1977, Pat. No. 4,185,041.

[51] Int. Cl.$^3$ .................... C08L 83/08; C08L 75/04
[52] U.S. Cl. ........................ 525/477; 260/37 SB; 525/453; 525/474; 525/538
[58] Field of Search ............... 260/2.3, 825, 824, 827; 525/477

[56] References Cited

U.S. PATENT DOCUMENTS

| | | | |
|---|---|---|---|
| 3,580,870 | 5/1971 | Rosner | 260/824 R |
| 3,663,469 | 5/1972 | Weissmahr | 260/858 |
| 3,726,944 | 4/1973 | Bennett et al. | 260/2.3 |
| 4,000,166 | 12/1976 | Witner et al. | 260/824 R |
| 4,026,839 | 5/1977 | Dieck et al. | 260/824 R |
| 4,057,090 | 11/1977 | Hoshikawa et al. | 106/33 |

*Primary Examiner*—Wilbert J. Briggs, Sr.
*Attorney, Agent, or Firm*—Joseph E. Rusz; Cedric H. Kuhn

[57] ABSTRACT

A sealant composition comprising a non-crosslinked, elastomeric mastic and an extrusion-inhibiting amount of vulcanized rubber particles of irregular shape and having sharp edges and angular surfaces. When the composition is used as a channel sealant, the ability of the particles to deform at structural gaps while offering resistance to extrusion prevents the loss of the elastomeric mastic.

15 Claims, 2 Drawing Figures

CHANNEL SEALANT COMPOSITIONS

RIGHTS OF THE GOVERNMENT

The invention described herein may be manufactured and used by or for the Government of the United States for all governmental purposes without the payment of any royalty.

This application is a division of copending U.S. application Ser. No. 830,227, filed on Sept. 2, 1977, now U.S. Pat. No. 4,185,041.

FIELD OF THE INVENTION

This invention relates to sealant compositions which are particularly useful as channel sealants.

BACKGROUND OF THE INVENTION

Aircraft integral fuel tanks are so named because they are an integral part of the aircraft frame and skin. While use of irregularly shaped cavities of wings and fuselage as fuel tanks is a necessary and desirable utilization of space particularly in military aircraft, the problem of sealing the cavities so as to inhibit hazardous fuel leakage has been the subject of extensive research. Thus, the aircraft frame and skin must be sealed at every joint and fastener by a flexible material to provide a permanent barrier to fuel leakage. Fuel resistant elastomers, such as polysulfides, fluorosilicones, polyesters, cyanosilicones, and urethanes have been used as sealants with varying degrees of success.

Integral fuel tank sealants can be divided into three types, namely, (1) filleting, (2) faying, and (3) channel. Filleting sealants are viscous liquid polymer mixes which are extruded over seams, into joint corners, over fasteners, and around openings for hydraulic lines and electrical conduits. Generally, this type cures to a tough rubber-like material in a few days at room temperature. Repair is accomplished by physically removing the fillet and reapplying a fillet of the same or a compatible material. In inaccessible areas it is difficult to make repairs. Faying sealants are liquid elastomeric compounds, often thinned with a solvent, which are applied between skin and structural members. After application to the mating surfaces, the parts are fastened together. Most faying surface sealants are room temperature vulcanizing porducts that reach full state of vulcanization in a few days. It is necessary to disassemble the skin and frame in order to repair faying surface sealants. Channel sealants are non-vulcanizing mastics that are injected into grooves formed in the structure-skin joints. The sealants can be applied as the aircraft is assembled or injected through ports after assembly.

While any one of the three types of sealants described in the preceding paragraph can be used alone, to ensure reliability many aircraft often employ two or all three. When the non-curing channel sealant is utilized as the primary sealant for integral fuel tanks, a careful balancing of properties is required. The sealant must have an elastomeric flexibility, it must adhere to metal with a tacky-type adhesion, it must resist being pushed or extracted from the joint by fuel, and it must retain these properties over a wide temperature range, e.g., from −65° F. to 350° F. The most common failure mode for channel sealants is gap extrusion caused by pressure build-up in the channel from thermal expansion, fuel swell, internal tank pressures, and, to a lesser extent, joint flexing and gas formation from polymer degradation. In U.S. Pat. No. 3,580,870 a channel sealant composition is disclosed that includes a sealant medium containing plastic balls or spheres graduated in size from large balls to medium size balls to small balls. As described by the patentee, the balls congregate or cluster along gaps between the skin sheet and wall of a fuel tank, thereby preventing escape of sealant material. Under test conditions comparable to those encountered in aircraft operation, it has been found that the sealant composition containing plastic balls is ineffective in preventing fuel leakage.

It is a principal object of this invention, therefore, to provide a channel sealant composition which is effective in preventing fuel leakage from integral fuel tanks.

Another object of the invention is to provide a channel sealant having a composition such that loss of sealant through structural gaps through extrusion is minimized.

A further object of the invention is to provide a sealant composition which, when injected into a channel of an integral fuel tank, exerts a squeegee action in pushing out and completely replacing old sealant.

Figure 2:
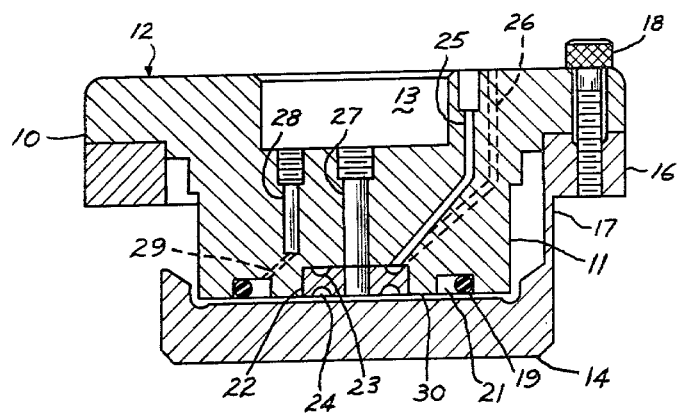

Other objects and advantages of the invention will become apparent to those skilled in the art upon consideration of the accompanying disclosure and the drawing, in which:

FIG. 1 is a plan view of apparatus employed in evaluating the performance of channel sealants, and FIG. 2 is a cross sectional view taken along line 2—2 of FIG. 1.

SUMMARY OF THE INVENTION

Broadly speaking, the present invention resides in the discovery that the addition of vulcanized rubber particles of irregular shape and having sharp edges and angular surfaces or faces to a non-crosslinked (uncured) elastomeric mastic provides a gap extrusion preventative that solves the problem of premature failure of aircraft integral fuel tank sealants. As a result of the addition of the particles, the service life of the sealant composition is greatly extended over that of conventional sealants containing plastic or glass beads. The ability of the elastomeric particles to a deform at structural gaps while still offering resistance to extrusion prevents the loss of the non-crosslinked mastic.

In a specific embodiment, the sealant composition of this invention comprises a non-crosslinked elastomeric mastic and about 10 to 100 weight percent, based on the weight of the mastic, of vulcanized rubber particles of irregular shape and having sharp edges and angular faces ranging in length from about 0.010 to 0.040 inch.

In general, any of the non-crosslinked elastomers described in the literature as being useful as channel sealants can be employed as the mastic. These materials generally have the consistency of a caulking compound and like such compounds have the ability to be injected under pressure from a caulking gun. The materials also have other desirable properties, e.g., maintenance of tackiness, viscosity, and adherence to metal surfaces over a wide temperature range (−65° F. to 350° F.). A fluorosilicone type of mastic, such as a 3,3,3-trifluoropropyl (methyl) siloxane polymer available from Dow Corning Corp., Midland, Mich., under the designation DC 94011, can be utilized with advantage. A preferred mastic is poly(fluoroalkylarylenesiloxanylene) which has been found to give an outstanding sealant composition when blended with the vulcanized rubber particles. Examples of other materials that can be used as the mastic include polyurethane, poly(fluoroalkyoxy phosphazene), and cyanosilicone elastomers.

The particles can be formed from any suitable vulcanizate that is compatible with the mastic base and possesses a high strength and a high modulus. The tensile strength of the vulcanizate should be at least 1000 psi, e.g., from 1000 to 6000 psi, and it should have a hardness of at least 80 Shore A points, e.g., 80 to 95 Shore A points. Vulcanizates of fluorosilicone polymers are often preferred although vulcanizates that generally meet the foregoing criteria can be satisfactorily employed. For example, particles formed from a vulcanizate prepared from the same elastomer used as the mastic can be advantageously used.

A more comprehensive understanding of the invention can be obtained by referring to the illustrative examples which are set forth hereinafter. In the runs described in the examples, the apparatus shown in FIGS. 1 and 2 was used in testing the several sealant compositions.

As depicted in FIGS. 1 and 2, the test apparatus of metal construction includes a top plate member 10 having a downwardly cylindrical extension 11. The combination of member 10 and extension 11 constitutes a plug 12 having a cylindrical cavity 13 centrally located in its upper portion. Bottom plate member 14 is attached to ring member 16 by means of connecting means or connector 17. There are three connectors, only one of which is shown in FIG. 2. Ring member 16 supporting bottom plate member 14 by means of connectors 17 is attached to top plate member 10 by bolts 18 disposed around the periphery of the latter member. A Viton O-ring 19 disposed in groove 21 formed in the bottom end of plug 12 provides a seal between the plug and the bottom plate member.

Positioned in a cylindrical cavity centrally located in the lower portion of plug 12 inwardly from groove 21 is a disc or washer 22. The upper and lower surfaces of the disc are each provided with upper and lower semicircular grooves or channels 23 and 24. Passageways 25 and 26 formed in plug 12 extend from the exterior face of the plug to upper channel 23 in disc 22. A first dam (not shown) in the upper channel separates the points of entry of the two passageways to the groove. A second dam (not shown) is disposed in the upper channel opposite the first dam and a hole (not shown) adjacent to each side of the dam communicates the upper channel with the lower channel.

A passageway 27 extends from the surface of cavity 13 through plug 12 and disc 22. The lower end of passageway 28, which extends from the surface of cavity 13 into plug 12, is connected to groove 21 by passageway 29. While the gap or clearance 30 between plus 12 and bottom plate 14 can be varied, in the tests the gap was about 6 mils.

In conducting each of the tests, sealant was injected through passageway 25 into upper channel 23. Using a hand operated arbor press, the injection pressure was between 1000 and 2000 psi. Because of the presence of the first dam, the sealant moved in a clockwise direction as it filled one-half of the upper channel. When the injected sealant met the second dam in the upper channel, it flowed downwardly through the hole adjacent the dam into lower channel 24. As injection was continued, the sealant filled lower channel 24 in a counterclockwise direction due to the presence of a third dam in the lower channel and then flowed through the second hole adjacent the dam upwardly into the unfilled half of upper channel 23. The injection was continued until the remaining half of the upper channel was filled as evidenced by the extrusion of sealant through passageway 26. Upon completion of sealant injection, the injection port of passageway 25 and the exit port of passageway 26 were sealed with plugs. The test apparatus was then placed in a −54° C. (−65° F.) to 177° C. (350° F.) environmental chamber. A leak line was connected between passageway 28 and a leak collector, and a fuel pressure line was connected between passageway 27 and a pressurized fuel source. During the test the fuel pressure line was maintained under a pressure of about 20 psig with JP-4 fuel. The basic cycle consisted of 8 hours at 350° F. and 16 hours at −65° F. The heat cycle included about 1 hour heatup time while the cool down consumed about 1 hour out of the 16 hour low temperature part of the cycle. The 24 hour heat-cool cycle was repeated 20 times unless failure occurred sooner as evidenced by the presence of fuel in the fuel collector.

EXAMPLE I

A run was conducted in which vulcanized elastomer particles were prepared for subsequent use in the preparation of the sealant composition of this invention. Initially, a vulanizate was prepared of a 3,3,3-trifluoro propyl (methyl) siloxane polymer (a product of Dow Corning Corp. designated LS 422) in accordance with the following formulation:

|  | Parts by weight |
|---|---|
| 3,3,3-trifluoro propyl (methyl) siloxane gum (LS 422) | 100 |
| Fumed silica (Cab-o-sil MX-7) | 20 |
| $Fe_2O_3$ (Mapico Red 297) | 0.8 |
| Dichloro benzoyl peroxide (Luperco CST) | 1.6 |

The foregoing ingredients were blended and the resulting mixture was press cured for 5 minutes at 115° C. (240° F.) in 6"×6"×0.40" molds (1000 psi molding pressure per square inch of mold area). Post curing was carried out in an air oven for 24 hours at 150° C. (302° F.). Physical properties of the vulcanizate are listed below.

| Tensile strength, psi | 1130 |
|---|---|
| Elongation, % | 140 |
| Hardness, Shore A points | 88 |

The vulcanizate was chopped to about 0.25 inch chunks by a scrap plastic chopper and then further sized by wet chopping in a close set Labconco grinder. The particles were wet screened through a 0.0394" sieve (size 18, U.S. Standard Sieve Series) and caught on a 0.0117" sieve (size 50). The particles were irregular in shape being roughly cubical with sharp angular faces. After washing with water, the particles were dried in an air circulating oven at 100° C. (212° F.).

EXAMPLE II 3,3,3-Trifluoro propyl (methyl) siloxane polymer sealant (a product of Dow Corning Corp. designated DC 94011) was blended with 20 parts by weight, based upon 100 parts by weight of the polymer sealant, of the vulcanized particles prepared as described in Example I. The sealant was injected into the test apparatus after which the apparatus was placed in the environmental chamber and subjected to the test conditions described above. After 20 heat-cool cycles, the sealant still had not failed as evidenced by the fact that there was no fuel leakage.

EXAMPLE III

Sealant composition as prepared in Example II was used to reinject a portion of a F-111 aircraft integral fuel tank. The sealant was made blue by blending it with 0.25 weight percent Prussian blue (ferric ferrocyanide, $Fe_4[Fe(CN)_6]_3$). The sealant was injected with a Grover 223 gun with a 40 psig air supply. The blue sealant pushed out with old white sealant (DC 94011) completely and was successfully reinjected past voids in the structure. The amount of mixing of blue and white sealants was approximately 1" along the sealant pushed out. A plastic faced test rig was used to observe the vulcanized particles as they squeegeed the surface clean of old sealant.

EXAMPLE IV

A sealant was prepared with poly(fluoroalkylarylene siloxanylene) [FASIL] having the following structural formula:

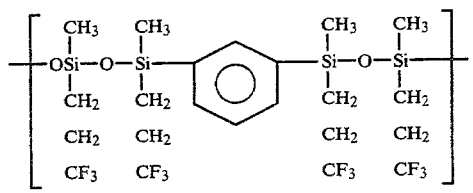

The following formulation was used in preparing the mastic:

| Mastic | |
|---|---|
| | Parts by weight |
| Polymer (FASIL) | 100 |
| Fumed silica | 30 |
| Fe₂O₃ (Mapico Red 297) | 2 |
| α,α'-bis(t-butyl peroxy) diisopropyl benzene | 10 |

The ingredients of the formulation were dissolved in equal parts by weight of a solvent mixture of acetonitrile and acrylonitrile. The resulting solution was heated in a closed vessel at 171° C. for 1 hour and then post treated for 24 hours in a 200° C. air oven.

The foregoing formulation was also used in preparing the vulcanizate from which vulcanized particles were made. The ingredients of the formulation were mixed, press molded for 20 minutes at 171° C., and post cured for 24 hours at 200° C. The vulcanizate obtained was fractured to particles in a liquid nitrogen cooled impact grinder.

Equal parts by weight of mastic and vulcanized particles, i.e., 100 weight percent particles, based on the mastic, were blended to form a sealant composition. The sealant was injected into the test apparatus after which the apparatus was placed in the environmental chamber. The test conditions were modified from those described above in that each cycle consisted of 8 hours at 320° F. followed by 16 hours of cooling to 77° F. During the heat-cool cycles, a fuel pressure of 20 psig was maintained. There was no failure after 20 cycles as shown by no fuel leakage. Failure occurred only after 4 additional cycles at 450° F. and one at −65° F.

EXAMPLE V

A commercial Poly(fluoroalkoxy phosphazene) (PNF) elastomer was reduced in viscosity by subjecting the polymer to a temperature of 204° C. (400° F.) for 4 hours in restricted contact with air. The resultant flowable polymer was formulated as a channel sealant in accordance with the following recipe:

| | Parts by weight |
|---|---|
| Liquid PNF polymer | 100 |
| Filler[1] | 100 |
| Vulcanized Particles of Example I | 20 |

(1) Lithium aluminum silicate (Lathafrax) The sealant was injected into the test apparatus and cycled under the specified conditions, i.e., 8 hours at 350° F. and 16 hours at −65° F. while under 20 psig fuel pressure (except for week-ends). After 20 such heat-cool cycles, the sealant had not failed. Examination of the disassembled test apparatus showed the sealant to be capable of many more such cycles.

EXAMPLE VI

A sealant formulated in accordance with the following recipe was provided by Dow Corning Corp:

| | Parts by weight |
|---|---|
| Polymer[1] | 100.0 |
| Fumed silica[2] | 25.2 |
| Carbon black (Ware B8064 conductive) | 5.0 |
| Carbon black (Williams 1011) | 1.7 |

(1) LS/FCS 210 2:1 alternating polymer having the following formula:

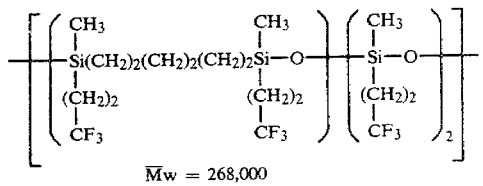

$\overline{M}w = 268,000$ (2) Cab-o-sil treated with a compound having the following formula:

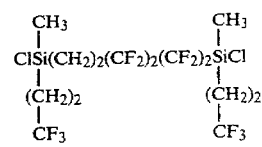

In a control run, the sealant was injected into the test apparatus and then cycled under the conditions specified above. Failure of the sealant occurred in one cycle.

EXAMPLE VII

The sealant prepared as described in Example VI (100 parts by weight) was blended with styrene-divinyl benzene beads (11.11 parts by weight). The amount of beads was based on the amount in commercial DC 94031 sealant, a product of Dow Corning Corp. The following was the bead distribution:

|  | Parts by weight |
| --- | --- |
| 8–30 mesh | 4.5 |
| 40–70 mesh | 2.0 |
| 200–400 mesh | 1.0 |

In a control run, the sealant containing the beads was injected into the test apparatus and then cycled under the conditions specified above. Failure of the sealant containing beads occurred in one cycle as did the base sealant as described in Example VI.

EXAMPLE VIII

The sealant prepared as described in Example VI (100 parts by weight) was blended with vulcanized particles prepared as described in Example I (20 parts by weight). The so prepared sealant composition of this invention was injected into the test apparatus and then cycled under the conditions specified above. The sealant failed after completing 3 cycles. Failure of the sealants in examples VI, VII and VIII resulted from loss of adhesion to the metal channel, allowing capillary seepage of fuel.

EXAMPLE IX

The surfaces of the test apparatus that come into contact with sealant were cleaned to bright metal, washed with water containing detergent, and rinsed with distilled water. After being air dried, the surfaces were primed with DC 1204 primer, a commercial hydrolyzing type primer. The sealant containing vulcanized particles as described in Example VIII was injected into the test apparatus and then cycled under the conditions specified above. The sealant had not failed after 20 heat-cool cycles and examination indicated that the sealant would have been capable of many more cycles before failure.

EXAMPLE X

There is summarized in the table below the results obtained when various sealants were injected in the test apparatus and cycled under the conditions specified above.

TABLE

| Sealant Designation | Cycles to failure |
| --- | --- |
| DC 94011[1] | 5 |
| DC 94031[2] | 5 |
| LS 77135[3] | 5 |
| LS209301[4] | 11 |
| GE 651[5] | 15 - Not reinjectable |
| DC 94011 plus particles[6] | 20 - No failure |
| LS/FCS 210[7] | 1 - Adhesion to metal failed |
| LS/FCS 210 plus beads[8] | 1 - Adhesion to metal failed |
| LS/FCS 210 plus particles[9] | 3 - Adhesion to metal failed |
| LS/FCS 210 plus particles with[10] primed surfaces of test apparatus | 20 - No failure |
| PNF plus particles[11] | 20 - No failure |
| FASIL plus particles[12] | 20 - No failure |

[1] Commercial sealant described in Example II.
[2] Commercial sealant which is DC 94011 with styrene/divinyl benzene added. The sealant is disclosed in U.S. Pat. No. 3,580,870.
[3] Poly(3,3,3-trifluoropropyl (methyl) siloxane) containing less than 1 mole % methyl vinyl siloxane in the polymer and a temperature sensitive free radical initiator.
[4] A variety of LS 77135.
[5] Commercial poly[ethylcyano(methyl)siloxane].
[6] Sealant of this invention described in Example II.
[7] Sealant described in Example VI.
[8] Sealant described in Example VII.
[9] Sealant of this invention described in Example VIII.
[10] Sealant of this invention described in Example IX.
[11] Sealant of this invention described in Example V.
[12] Sealant of this invention described in Example IV.

The data in the foregoing examples demonstrate that the channel sealant of this invention is effective in preventing fuel leakage under conditions comparable to those that may be encountered by aircraft integral fuel tanks. The instant channel sealant is greatly superior to conventional sealants and provides an urgently needed solution to the problem of premature failure of such sealants. It is noted in particular that the channel sealant composition containing the above-described vulcanized rubber particles has an effectiveness factor many times greater than that of sealants containing plastic balls as disclosed in the patent referred to hereinabove.

As will be evident to those skilled in the art, modifications of the present invention can be made in view of the foregoing disclosure without departing from the spirit and scope of the invention.

I claim:

1. A channel sealant composition consisting essentially of (1) a non-crosslinked, hydrocarbon fuel-resistant, elastomeric mastic having the consistency of a caulking compound, said elastomeric mastic comprising an elastomer selected from the group consisting of fluorosilicone and cyanosilicone elastomers and (2) an extrusion-inhibiting amount of vulcanized elastomeric particles of irregular shape and having sharp edges and angular surfaces, the particles being formed from a vulcanizate of a hydro-carbon fuel-resistant elastomer selected from the group consisting of fluorosilicone and cyanosilicone elastomers, said vulcanizate having a tensile strength of at least 1000 psi and a hardness of at least 80 Shore A points.

2. The composition according to claim 1 that consists essentially of about 10 to 100 weight percent vulcanized particles, based upon the weight of the elastomeric mastic.

3. The composition according to claim 2 in which the vulcanized particles of irregular shape have sharp edges and angular faces ranging in length from about 0.010 to 0.040 inch.

4. The composition according to claim 3 in which the vulcanized particles are formed from a vulcanizate having a tensile strength ranging from 1000 to 6000 psi and a hardness ranging from 80 to 95 Shore A points.

5. The composition according to claim 2 in which the particles are formed from a vulcanizate prepared from the same elastomer used as the mastic.

6. The composition according to claim 2 in which the elastomer is a fluorosilicone elastomer.

7. The composition according to claim 6 in which the fluorosilicone elastomer is a 3,3,3-trifluoro propyl (methyl) siloxane polymer.

8. The composition according to claim 7 in which the vulcanized particles are formed from a vulcanizate of 3,3,3-trifluoro propyl (methyl) siloxane polymer.

9. The composition according to claim 6 in which the fluorosilicone elastomer is a 2:1 alternating polymer having the following formula:

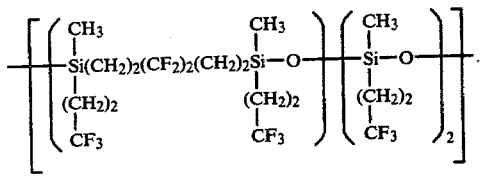

10. The composition according to claim 9 in which the vulcanized particles are formed from a vulcanizate of the 2:1 alternating polymer.

11. The composition according to claim 6 in which the fluorosilicone elastomer is poly(fluoroalkylarylenesiloxanylene).

12. The composition according to claim 11 in which the vulcanized particles are formed from a vulcanizate of a 3,3,3-trifluoro propyl (methyl) siloxane polymer.

13. The composition according to claim 2 in which the elastomer is a cyanosilicone elastomer.

14. The composition according to claim 13 in which the cyanosilicone elastomer is poly[ethylcyano(methyl)siloxane].

15. The composition according to claim 14 in which the vulcanized particles are formed from a vulcanizate of a 3,3,3-trifluoro propyl (methyl) siloxane polymer.

* * * * *